US008805814B2

(12) United States Patent
Zijlstra et al.

(10) Patent No.: US 8,805,814 B2
(45) Date of Patent: Aug. 12, 2014

(54) METHODS AND SYSTEMS FOR SEARCHING DATABASES AND DISPLAYING SEARCH RESULTS

(75) Inventors: Jaco Zijlstra, Amsterdam (NL); Spencer De Groot, San Leandro, CA (US); M'Hamed El Aisati, Amsterdam (NL); Robbertjan Kalff, Amsterdam (NL); Usbrand Jan Aalbersberg, Amsterdam (NL)

(73) Assignee: Elsevier B.V., Amsterdam (NL)

( * ) Notice: Subject to any disclaimer, the term of this patent is extended or adjusted under 35 U.S.C. 154(b) by 633 days.

(21) Appl. No.: 11/261,242

(22) Filed: Oct. 27, 2005

(65) Prior Publication Data

US 2006/0112085 A1 May 25, 2006

Related U.S. Application Data

(60) Provisional application No. 60/622,710, filed on Oct. 27, 2004.

(51) Int. Cl.
*G06F 17/30* (2006.01)

(52) U.S. Cl.
CPC .................................. *G06F 17/3005* (2013.01)
USPC .......................................................... 707/707

(58) Field of Classification Search
USPC ............................................... 707/1–10, 707
See application file for complete search history.

(56) References Cited

U.S. PATENT DOCUMENTS 5,907,837 A * 5/1999 Ferrel et al. ..................... 707/3
5,991,751 A * 11/1999 Rivette et al. ................... 707/1
6,026,388 A * 2/2000 Liddy et al. ..................... 707/1
6,175,824 B1 * 1/2001 Breitzman et al. .......... 705/36 R
6,182,065 B1 * 1/2001 Yeomans ..................... 707/706
6,266,675 B1 * 7/2001 Evans et al. ..................... 707/3
6,324,534 B1 * 11/2001 Neal et al. ..................... 706/12
6,385,602 B1 * 5/2002 Tso et al. ......................... 707/3
6,505,196 B2 * 1/2003 Drucker et al. .................. 707/5

(Continued)

FOREIGN PATENT DOCUMENTS

WO WO 02/091155 11/2002

OTHER PUBLICATIONS

Web of Science V4.1, Science Citation Index Expanded, Social Sciences Citation Index, Arts & Humanities Citation Index, Oct. 1999, pp. 1-37.*

(Continued)

*Primary Examiner* — Mariela Reyes
*Assistant Examiner* — Nirav K Khakhar
(74) *Attorney, Agent, or Firm* — Dinsmore & Shohl LLP

(57) ABSTRACT

In one aspect, the invention comprises a computer system comprising databases storing information regarding publications, the information comprising author, title, date of publication, abstract, cited references, and citing references data; and Internet servers in communication with the databases; wherein at least one of the Internet servers is in communication with and operable to transmit data to a Web browser application resident on a user's computer, and wherein the data is sufficient to enable the browser to display: (a) a search page for enabling the user to input publication search parameters; and (b) a results page comprising a tabular display of results that enables the user to sort results according to date, relevance, author, source title, and number of citations to each publication, and further comprising a list of publication titles, with each title having one or more adjacent selectable links to an aspect of the publication corresponding to the title.

11 Claims, 17 Drawing Sheets

(56) References Cited

U.S. PATENT DOCUMENTS

| | | | | |
|---|---|---|---|---|
| 6,594,670 | B1* | 7/2003 | Genser | 707/102 |
| 6,625,595 | B1* | 9/2003 | Anderson et al. | 707/3 |
| 6,907,424 | B1* | 6/2005 | Neal et al. | 707/706 |
| 6,944,612 | B2* | 9/2005 | Roustant et al. | 707/706 |
| 6,961,731 | B2* | 11/2005 | Holbrook | 707/3 |
| 7,165,080 | B2* | 1/2007 | Kotcheff et al. | 707/706 |
| 7,171,424 | B2* | 1/2007 | Barsness et al. | 707/102 |
| 7,216,115 | B1* | 5/2007 | Walters et al. | 707/3 |
| 7,231,596 | B2* | 6/2007 | Koren | 715/210 |
| 2002/0156760 | A1* | 10/2002 | Lawrence et al. | 707/1 |
| 2003/0001873 | A1* | 1/2003 | Garfield et al. | 345/700 |
| 2003/0061226 | A1* | 3/2003 | Bowman et al. | 707/100 |
| 2003/0101230 | A1* | 5/2003 | Benschoter et al. | 709/217 |
| 2004/0205078 | A1* | 10/2004 | Galindo-Legaria et al. | 707/100 |
| 2005/0010559 | A1* | 1/2005 | Du et al. | 707/3 |
| 2005/0256734 | A1* | 11/2005 | Clikeman | 705/1 |
| 2006/0004739 | A1* | 1/2006 | Anthony et al. | 707/4 |
| 2006/0041608 | A1* | 2/2006 | Miller et al. | 707/205 |
| 2006/0053158 | A1* | 3/2006 | Hall et al. | 707/102 |
| 2006/0064411 | A1* | 3/2006 | Gross et al. | 707/3 |
| 2006/0122988 | A1* | 6/2006 | Arrouye et al. | 707/3 |

OTHER PUBLICATIONS

CiteSeer: an automatic citation indexing system. Year of Publication: 1998. C. Lee Giles et al. International Conference on Digital Libraries. Proceedings of the third ACM conference on Digital libraries.*

Steve Lawrence et al. Indexing and retrieval of scientific literature. Conference on Information and Knowledge Management. Proceedings of the eighth international conference on Information and knowledge management. Publication 1999.*

Yulan He, and Siu Cheung Huia. Mining a Web Citation Database for author co-citation analysis. Information Processing & Management. vol. 38, Issue 4, Jul. 2002, pp. 491-508.*

De Groot S P et al: "Applying the User-Centered Design (UCD) process to the development of a large bibliographic navigation tool: a partnership between librarian, researcher and developer.". Internet Publication [Online], Jun. 16, 2004, http://www.elsevier.com/framework_librarians/WhitePapers/White_Paper_1_Usability_Testing.pdf ; see sectioin "use of citations" and abstract.

Garfield Eugene: "Citation Analysis as a Tool in Journal Evaluation", Essays of an Informed Scientist, [Online] vol. 1, 1972, pp. 527-544, available at http://cybermetrics.cindoc.csic.es/cybermetrics/pdf/569.pdf.

Hitchcock S et al: "Evaluating Citebase, an open access Web-based citation-ranked search and impact discovery service" Internet Publication—Technical Report, [Online] Jul. 2003, University of Southhampton, available at http://opcit.eprints.org/evaluation/Citebase-evaluation/evaluation-report-tr.pdf; see abstract, section 2.2, section 7.2, section 4 and figure 4.1.

Sartiani; *A Framework for Estimating XML Query Cardinality*, Jun. 12, 2003; International Workshop on the Wed and Databases (WebDB).

Lawrence S et al: "Digital Libraries and Autonomous Citation Indexing", Computer, IEEE Service Center, Los Alamitos, CA, vol. 32, No. 6, Jun. 1999, pp. 67-71, ISSN: 0018-9162; see section "Querying and Browsing" and figure 2.

Mark Logic Corp: "Mark Logic Content Interaction Server—Developer's Guide", Internet Publication [Online], Oct. 7, 2004, available at: http://xqzone.marklogic.com/pubs/2.2/books/dev_guide.pdf; see section 9.0 and section 11.0.

Smit E: "Evidence-based Development of e-products" Internet Publication [Online], Oct. 18, 2004, available at http://www.infonortics.com/chemical/ch04/slides/smit-2.pdf.

* cited by examiner

FIG. 2

SC⚙PUS

| Search | Sources | My Alerts | My List | My Profile |

Steven D Underwood is logged in  Logout
💡 Scopus Labs  ❓ Help

Easily find relevant results from over 14,000 peer-reviewed titles.

| Basic Search | Advanced Search | Author Search |

Search for:

❓ Search Tips

◀ ▶

🔄 Search  Clear

| Field | Code | Field | Code | Field | Code |
|---|---|---|---|---|---|
| All Fields | ALL | Combined Field | TITLE-ABS-KEY | Publication Year | PUBYEAR |
| Article Title | TITLE | Combined Field | TITLE-ABS-KEY-AUTH | Volume number | VOLUME |
| Abstract | ABS | Source Title | SRCTITLE | ISSN Number | ISSN |
| Keywords | KEY | Affiliation | AFFIL | CODEN ID | CODEN |
| Author Name | AUTHOR-NAME | References | REF | DOI Number | DOI |

Complete list of all codes

Examples:
ALL("heart attack") AND AUTHOR-NAME(smith)
TITLE-ABS-KEY("somatic complaint wom?n) AND PUBYEAR AFT 1993
ALL(mccullough effect) AND NOT AUTHOR-NAME(mccullough) AND NOT REFAUTH(mccullough)
SRCTITLE("field ornith*) AND VOLUME(75) AND ISSUE(1) AND PAGES(53-66)

🔄 Search History

| Search | | Results | Source | | Actions | close |

You have not prformed any searches in this session.

SCOPUS

Steven D Underwood is logged in
Logout

Scopus Labs | Help

| Search | Sources | My Alerts | My List | My Profile |

Quick Search [___] [Go] | Search Tips

◄ results list | ◄ previous | 2 of 2

Astronomy and Geophysics
Volume 37, Issue 4, 1996, Pages 683-707

| Basic Format | Extended Format |

Document Type: Article

| print | export | e-mail | add to list |
View references (83)
— 820

'So much for fame!': The story of lewis swift

Wlasuk, P.T.

Department of Physics, Florida International University, University Park, Miami, FL 33199, United States

Abstract

Between 1862 and 1899, Lewis Swift discovered no fewer than 13 comets, making him one of the most prolific comet discoverers of all time. Swift was a farmer and hardware store owner by trade, whose first telescope was a homemade 3-inch refractor with a Spencer objective. His first comet discovery, 1862III, known popularly as Comet Swift-Tuttle, is the source of the famous Perseid meteor shower. All but one of Swift's comets were discovered with a 4 1/2-inch Fitz-Clark refractor. In 1882, Swift became a 'professional' astronomer, heading the Warner Observatory at Rochester, NY, using a 16-inch Clark refractor, then the fourth largest in the United States, to survey the heavens for new nebulae. Swift eventually found more than 1200 objects, ranking him third behind only the Herschels in this category, and first among American observers. In 1893, Swift relocated his 16-inch telescope to Echo Mountain in California, where he spent the remainder of his career at the Lowe Observatory. Today, the 16-inch Clark is used as a teaching instrument by Santa Clara University. The whereabouts of Swift's 3- and 4 1/2-inch refractors are unknown.

Cited By

This article has been cited 0 times in Scopus.

Alert me when this document is cited in Scopus

Related Documents
(by reference) — 810

FIG. 8A

References (83)

[Print] [export] [e-mail]  Select: ☐ All

1. ☐ MacRobert, A.M.
   (1992) *Sky Telesc.*, 84 p. 185
   August

2. ☐ Marsden, B.G.
   (1993) *Sky Telesc.*, 85 p. 17
   January
   [View at Publisher]

3. ☐ Bortle, J.E.
   (1992) *Sky Telesc.*, 84 p. 220
   August

4. ☐ IAU Circ. 5620; IAU Circ. 5621

5. ☐ Mobberley, M.P.
   (1994) *J. Br. Astron. Assoc.*, 104 p. 11 Cited 2 times

6. ☐ (1992) *Naples Daily News*,
   November 16

7. ☐ (1992) *New York Times*, Cited 229 times

8. ☐ Rao, J.
   (1993) *Sky Telesc.*, 86 p. 43 Cited 2 times
   August

9. ☐ Lunsford, R.D.
   (1994) *Journal of the Lunar and Planetary Observers*, 37 pp. 120-126

10. ☐ Bates, R., McKelvey, B.
    Lewis Swift: The Rochester Astronomer
    (1947) *Rochester History*, 9 p. 1
    January 11. ☐ (1947) *Rochester History*, 9 p. 1

FIG. 8B

SCOPUS

| Search | Sources | My Alerts | My List | My Profile |

Steven D Underwood is logged in
Logout

Scopus Labs  Help

Quick Search [  ] Go  Search Tips

Scopus: 2 | Web: 1,230 | Patents | Combined Results

Your query: (TITLE-ABS-KEY(lewis) AND TITLE-ABS-KEY(clark)) AND SUBJAREA(phys)  Edit Save

Refine Results  ( ) limit to  ✗ exclude                                                                       close ☐ absorptive capacity      ☐ acquaintance       ☐ applied physics      ☐ beam deflection
☐ accelerator              ☐ adsorbed           ☐ astronomers          ☐ bi-2223 tapes
☐ accelerators             ☐ allylamine         ☐ atomic beam          ☐ bilayer films
                                                                        More...

Search within results [            ] Go

Results: 1,230                                                         1 to 20   next ▶

910 → 🖶 print | Date | Document (sort by relevance)
      📥 export | ✉ e-mail  Select: ☐ All ☐ Page 1. ☐   1998   Semiconductor Electrochemistry at Lewis & Clark Colleg
scirus         The corrosion of iron metal occurs when the oxidation of the iron is coupled to the reduction of another species. An
Web Result     example of destructive corrosion is rusting where O2 is the species being reduced. Corrosion, however, can have
               beneficial uses.
               [www.lclark.edu/~science/semicon/]
               More results from this site 2. ☐   2005   Lewis and Clark: Planning Phase Materials
scirus         Planning Phase Materials Page Maps (Arrowsmith/Nicholas King), Tj's secret message, ML letter to Clark
Web Result     [www.vcdh.virginia.edu/.../1iv1.html]

3. ☐   2003   Montana DEQ - Wind Energy Atlas - Lewis & Clark County
scirus         [www.deq.state.mt.us/.../Lewis&Clark.PDF]
Web Result

FIG. 9

SCOPUS

| Search | Sources | My Alerts | My List | My Profile |

Steven D Underwood is logged in
Logout

Scopus Labs    Help

Quick Search [        ] Go    Search Tips

| Scopus: 2 | Web: 1,230 | Patents: 16 | Combined Results |

Your query: (TITLE-ABS-KEY(lewis) AND TITLE-ABS-KEY(clark)) AND SUBJAREA(phys) Edit Save For more in-depth patent information click here:
○ "LexisNexis"

Refine Results   () limit to   ✕ exclude

☐ 05613498    ☐ 09769967    ☐ 86306261.8    ☐ 91301333.0
☐ 06538465    ☐ 82900474.6    ☐ 88900031.1    ☐ absorbing layer
☐ 08758749    ☐ 83201375.9    ☐ 90105444.5    ☐ acid ester
                                              More...

[                    ] close

Results: 16

Search within results [            ] Go print | export | e-mail   Select: ☐ All ☐ Page                                    1 to 16

| Date | Document (sort by relevance) |
|------|------------------------------|
| 1. ☐ 2005 | Load bearing fabric attachment and associated method<br>Coffield, Timothy P., Watson, Ronnie K., Petersen, Soren S. Ingomar, Chrostowski, Matthew E., Lewis, Randall Clark, Dahti, Inc.<br>An attachment structure for a load bearing fabric. The attachment structure includes interfitted inner and outer rings. The outer ring includes a fabric leg 74 carrying a load bearing fabric. The inner ring defines a channel receiving the fabric...<br>Patent record available from the US Patent office |
| 2. ☐ 1998 | Method of preparing small particle dispersions<br>Myers, David Lewis, Turkevich, Leonid Anthony, Kimberly-Clark Worldwide, Inc.<br>A method of preparing a dispersion of small particles in a polymeric precursor, which method involves providing a mixture of a particulate material and a surfactant in a nonaqueous solvent, forming a dispersion of the particulate |

FIG. 10

SCOPUS

| Search | Sources | My Alerts | My List | My Profile |

Quick Search [____] Go  ⑦ Search Tips

| Scopus: 2 | Web: 1,230 | Patents | Combined Results: 1,248 |

Your query: (TITLE-ABS-KEY(lewis) AND TITLE-ABS-KEY(clark)) AND SUBJAREA(phys)  Edit  Save Steven D Underwood is logged in  Logout
💡 Scopus Labs   ⑦ Help

⊟ Refine Results   ( ) limit to   ✕ exclude                                        close

| Source Title | Author Name | Subject Area | SCIrUS Web Keywords |
|---|---|---|---|
| ☐ Astronomy and Geophysics | ☐ Wasuk P T | ☐ Physics | ☐ absorption intensity |
| ☐ Nature | | ☐ Agricultural and Biological Sciences | ☐ accelerator |
| | | ☐ Chemistry | ☐ accelerators |
| | | More... | More... |

[_____] Go

Search within results [_____]

⊟ Results: 1,248                                                              1 to 20  next ▶

🖶 print  ⬇ export  ✉ e-mail   Select: ☐ All ☐ Page

| Date | Document (sort by relevance) |
|---|---|
| 1998 | Semiconductor Electrochemistry at Lewis & Clark Colleg   www.lclark.edu/... |
| SCIrUS Web Result | The corrosion of iron metal occurs when the oxidation of the iron is   .../semicon |
| | coupled to the reduction of another species. An example of destructive |
| | corrosion is rusting where O2 is the species being reduced. Corrosion, |
| | however, can have beneficial uses. |
| | More results from this site ⟵ 1110 |
| 2005 | Lewis and Clark: Planning Phase Materials   www.vcdh.virginia.edu/... |
| SCIrUS Web Result | Planning Phase Materials Page Maps (Arrowsmith/Nicholas King), Tj's   .../1iv1.html |
| | secret message, ML letter to Clark |
| 2003 | Montana DEQ - Wind Energy Atlas - Lewis & Clark County   www.deq.state.mt.us/... |
| | .../Lewis&Clark.PDF |

METHODS AND SYSTEMS FOR SEARCHING DATABASES AND DISPLAYING SEARCH RESULTS

CROSS-REFERENCE TO RELATED APPLICATIONS

This application claims the benefit of U.S. Provisional Application No. 60/622,710, filed Oct. 27, 2004. The entire contents of that provisional application are incorporated herein by reference.

BACKGROUND & SUMMARY

Various embodiments of the present invention are described herein. For ease of reference, we refer to these embodiments collectively as "Scopus." However, as those skilled in the art will recognize, the invention itself is not limited to these embodiments or to particular details discussed herein. The scope of the invention is defined solely by the appended claims as presented and/or subsequently amended and by other claims that may be added later.

Scopus is an online system that provides access to a searchable database containing scientific journal abstracts with references. It is meant to be used by researchers, scientists, and students to help locate scientific papers, and to allow access to the full-text, where available, for those papers.

Scopus provides to entitled users the ability to link to the full text of selected documents. Scopus preferably is a WebSphere application written in Java using a Web Services distributed architecture.

Briefly, Scopus provides the following functionality to a user:

A search begins on the Scopus home page. To perform a basic search, a user enters search terms in a "search for" field and clicks on "search." Scopus lists relevant results. The user has several options. He can link to an article of interest or refine his search by using a "refine results" box. "Refine results" gives the user an overview of his results by source title, author name, year, document type and subject area. If the user wishes to limit his results to a particular journal title, for example, he may select the title and click on "limit to" to have his results include only articles from the journal selected. As the user browses through a list of articles from this journal, he may click on an "abstract plus refs" button for more information about a particular article. From here he can read the abstract, view the citations that this article has received from other articles, and look at the references of this article which also offer links to their abstracts.

In one aspect, the invention comprises a computer system for searching databases and displaying search results, comprising: one or more databases storing information regarding publications, the information comprising author, title, date of publication, abstract, cited references, and citing references data; and one or more Internet servers in communication with the one or more databases; wherein at least one of the one or more Internet servers is in communication with and operable to transmit data to a Web browser application resident on a user's computer, and wherein the data is sufficient to enable the browser to display: (a) a search page for enabling the user to input publication search parameters; and (b) a results page comprising a tabular display of results that enables the user to sort results according to date, relevance, author, source title, and number of citations to each publication, and further comprising a list of publication titles, with each title having one or more adjacent selectable links to at least one aspect of the publication corresponding to the title.

In various embodiments, in various combinations: (1) for at least one publication, the aspect comprises a full text display of the publication; (2) for at least one publication, the aspect comprises an abstract display of the publication; (3) for at least one publication, the aspect comprises a display of references cited in the publication; and/or (4) the data is sufficient to enable the browser to display, for at least one listed publication, a numeral representing how many other publications have cited to the publication.

Other aspects and embodiments of the invention will be apparent to those skilled in the art after reviewing the drawings, detailed description, and claims provided below.

BRIEF DESCRIPTION OF THE DRAWINGS

FIG. 2 depicts a preferred basic search page.
FIG. 3A depicts a preferred advanced search page.
FIG. 4 depicts a first preferred results page.
FIG. 5 depicts a second preferred results page.
FIG. 6 depicts a third preferred results page.
FIG. 7 depicts a Save a Search Alert page.
FIGS. 8A & 8B depict an abstract and references page.
FIG. 9 depicts a Web search results display page.
FIG. 10 depicts a patents search results display page.
FIG. 11 depicts a combined results display page.
FIG. 12 depicts a Scirus browser window.
FIG. 14 depicts a preferred results display page with a search history displayed.
FIG. 15 depicts a preferred export page.

DETAILED DESCRIPTION OF PREFERRED EMBODIMENTS

Figure 1:
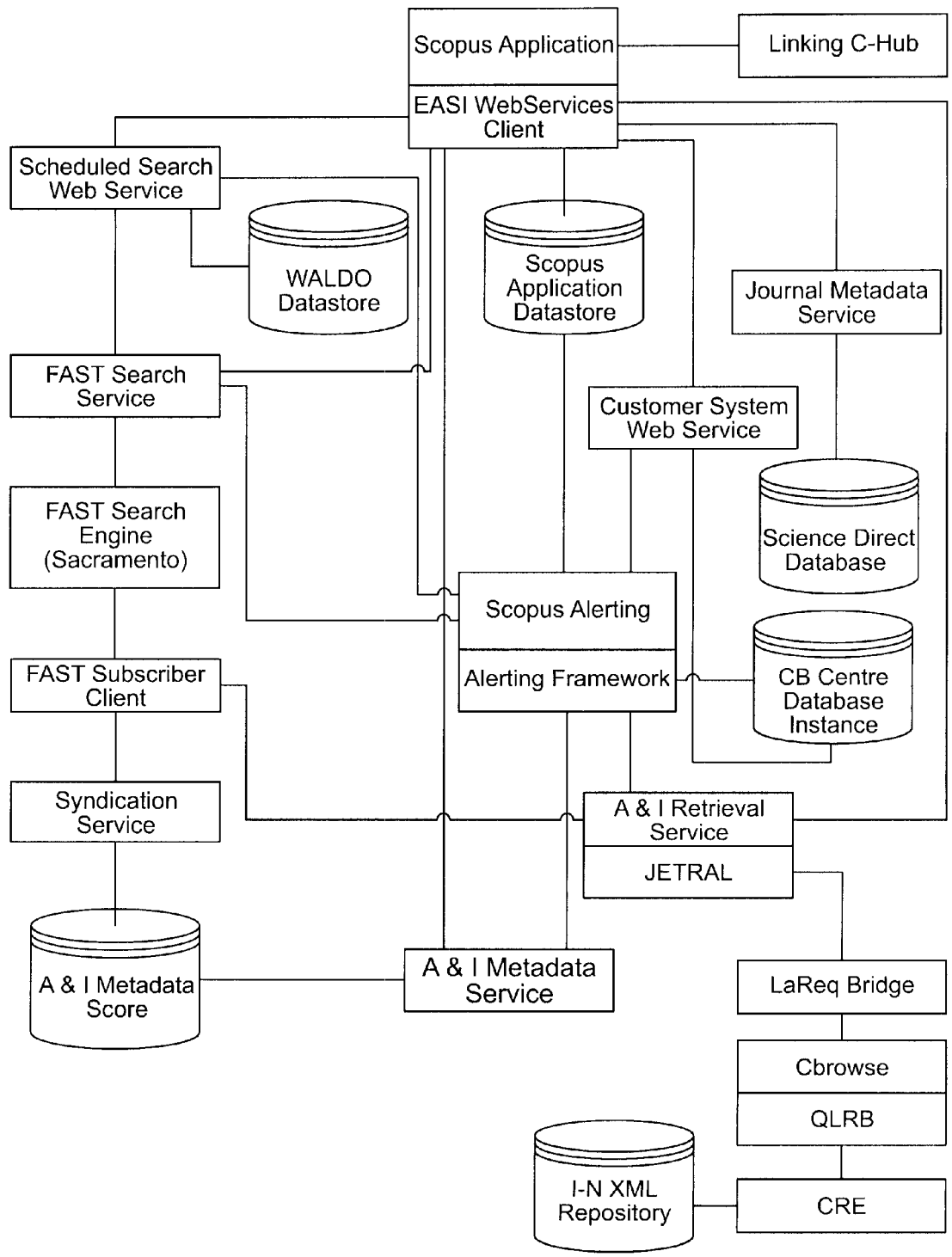
FIG. 1 depicts a preferred system diagram for Scopus.

Features and Functionality
Basic search:

In the Basic Search form (see FIG. 2), a user enters one or more search terms in one or both of the text entry boxes 210. A user may select a field type for the search from a list in boxes 220. The default setting is Article Title, Abstract, Keywords.

A user may set different field selections for each text box. For example, one can use one of the boxes to search for an author's name, and the other for terms.

Selecting "All Fields" in box 220 will search across all of the following fields: Authors, Source Title, Article Title, Abstract, Keywords, Affiliation, ISSN, CODEN, DOI, References, Conference, Editor, Correspondence, Citation Language, ISBN, and Collaboration.

Chemical Name and CAS Number will also be searched if these fields are available (field availability depends on the settings determined by the user's librarian or administrator.)

Proximity and Boolean operators may be used to narrow the scope of a search. For example, when using both text boxes 210, a user may select a Boolean operator (AND, OR, AND NOT) from a list 230 located in front of the second text entry box 210.

AND: Results must match the query from both text-boxes.
OR: Results must match the query from either of the text-boxes.
AND NOT: Results must match the query in the first text box but not the second.

One can also use operators by typing them into the text entry box 210. If a user enters more than one word or phrase in the same text entry field 210 without using an operator, AND will be assumed.

In Date Range boxes 240, a user may select a range to narrow his search. The range of years selected is inclusive. If no selection is made, the search will be performed for all years up to the present.

In an "Added to Scopus in the last ( ) days" box 250, a user may select a range to narrow his search. In a preferred embodiment, this will limit the search to documents added to Scopus in the last 7, 14, or 30 days.

Document Type box 260 allows a user to choose a document type from a list. If no selection is made, the search will include all document types listed. Preferred document types include: Article, Review, Letter, Editorial, Note, etc. Selecting "Article" or "Article or Review" includes conference papers within the search.

A user may check one or more Subject Area boxes 270 for his search. If no selection is made, all subject areas are included in the search.

A user clicks a Search button 280 to perform a search, or clicks a Clear button 285 to clear the text-boxes and reset the options.

Figure 3B:
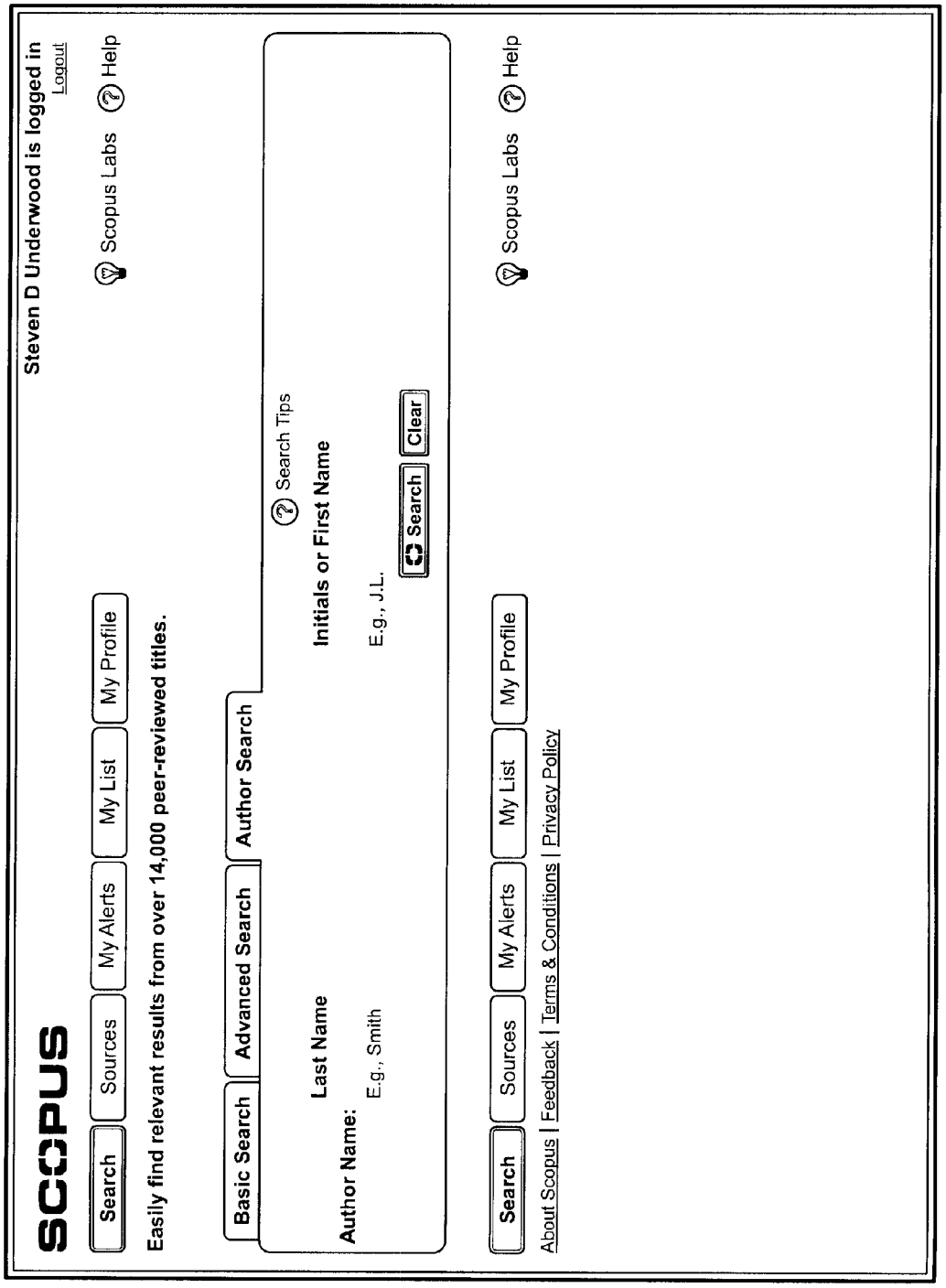
FIG. 3B depicts a preferred author search page.

If a user has set up a Basic Search and finds that there are parameters that he wants to add that cannot be added from the Basic Search form, the user may click Advanced Search tab 290. An Advanced Search form (see FIG. 3A) will open containing the query information the user has built within the Basic Search form. Advanced search allows a user to enter a command line search using Boolean operators. This form also may be accessed directly by clicking tab 290, without first setting up a Basic Search.

Quick search (see FIG. 4, box 405) allows a user to run a keyword search on title, abstract, author keyword, index keywords and author fields. Quick Search is available from any page except a search form page.

Author search: A user may select an "Author Search" tab 295 to enter an author name and find all articles associated with that author. An Author Search page (see FIG. 3B) allows the user to specify a query that results in a list with all spelling variants that match the query entered (e.g. "Smith, J" will find "Smith J." but also "Smith Johan" and "Smith J. L."). This search will also find Smith, L. J. A search for Patureau in the author field finds the name Patureau Mirand. A search for Patureau Mirand or Patureau-Mirand will find Patureau Mirand or Patureau-Mirand, but will not find Patureau or Mirand. One can also search for a part of an author name (e.g. "Moya" will find "Moya, S. A", "De Moya", "Moya-Cessa, H" and "Flores-Moya, A."). Names with multiple elements such as de la peña-olvera, f.r. are fully supported.

2. View Results:

Figure 4:
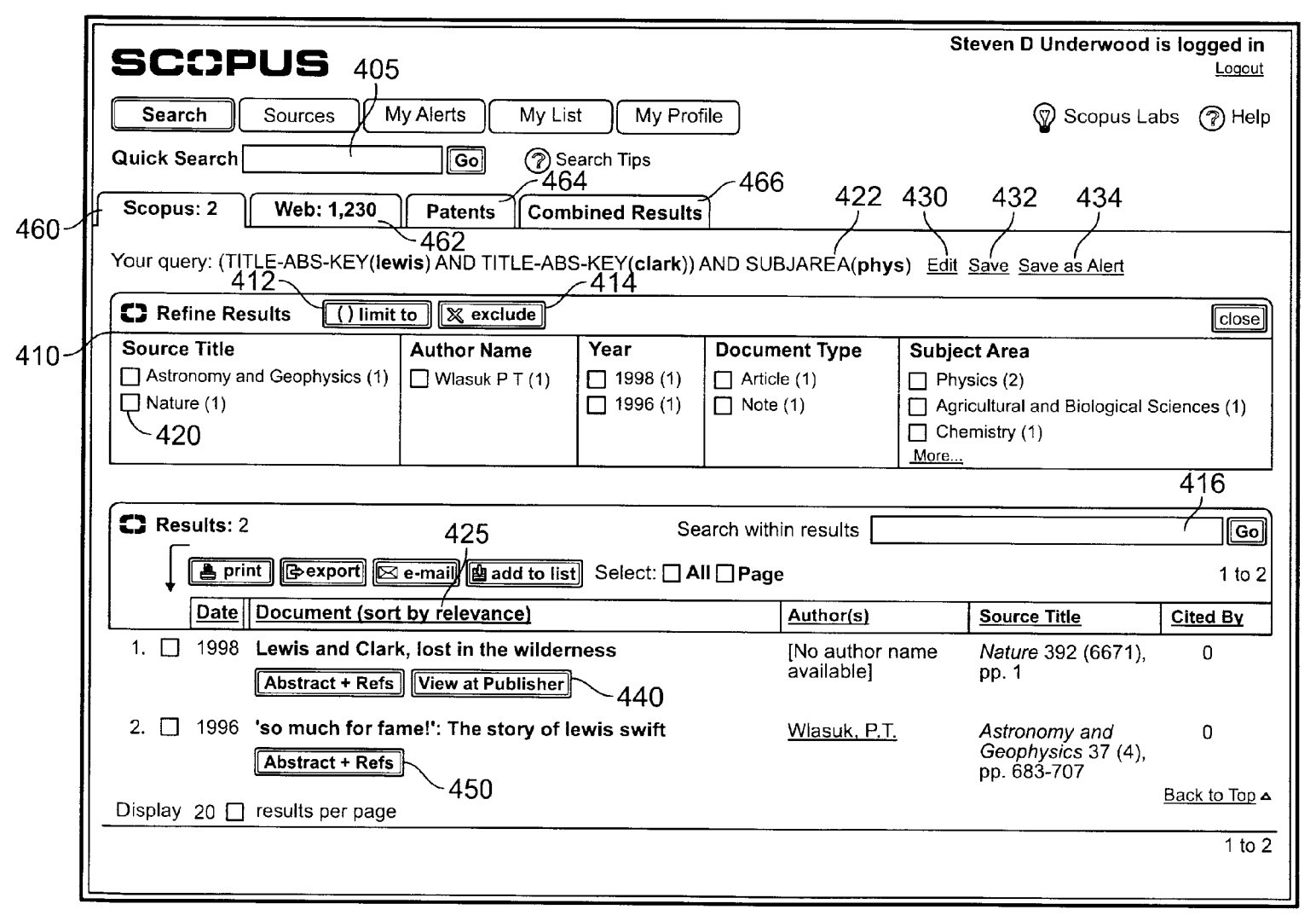

FIG. 4 depicts an exemplary results display page. Tabular display of results allows a user to easily sort results according to date, relevance, authors, source title and number of citations to each document ("Cited By").

Figure 5:
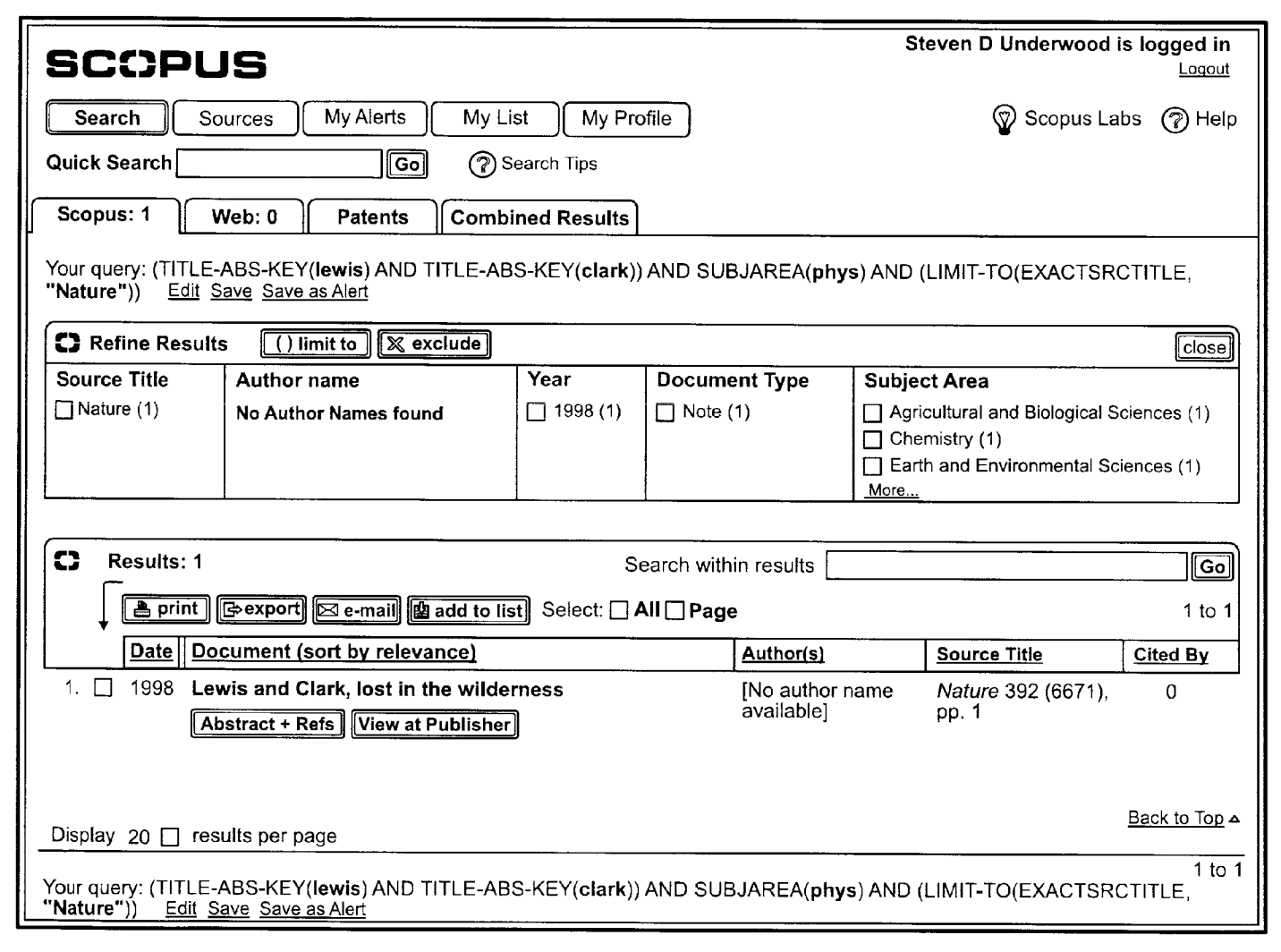

A Refine Results section provides a user with an overview of results according to source title, author name, year, document type, and subject area. A "limit to" button 412 may be used limit the displayed results to selected items. For example, in the results page depicted in FIG. 4, a user may limit the displayed results to only article published in the journal "Nature" by selecting the box 420 adjacent to "Nature" and then clicking the "limit to" button 412. The results page depicted in FIG. 5 is then displayed.

Figure 6:
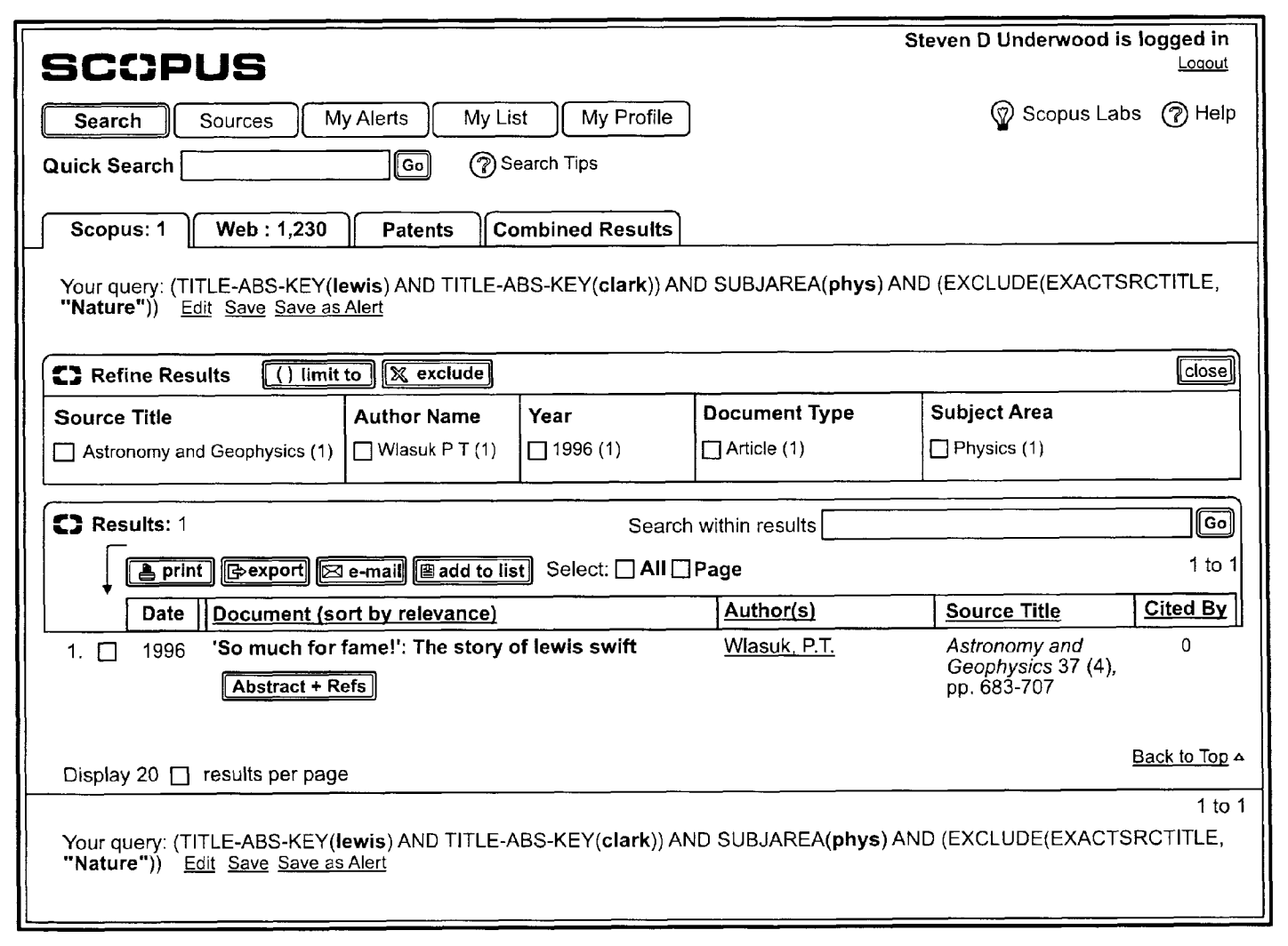

Likewise, a user may decide to exclude articles from the journal "Nature" from the displayed results. In that case (referring again to FIG. 4), the user would check box 420 and then click the "exclude" button 414. The results page depicted in FIG. 6 is then displayed.

A user also may search within a results list by using a "Search within results" box 416 (see FIG. 4). "Search within results" box 416 allows a user to search again through all fields within a results list.

A user may do the following from the links 430, 432, and 434 that follow the search query 422:

Edit: A user can edit the query in order to conduct another Basic Search, Advanced Search, or Author Search. If the user clicks the Edit link 430, the original Search page will display so that he may edit the search query.

Save: If a user clicks the Save link 432, the search will be saved as a Saved Search in the user's profile (My Profile).

Figure 7:
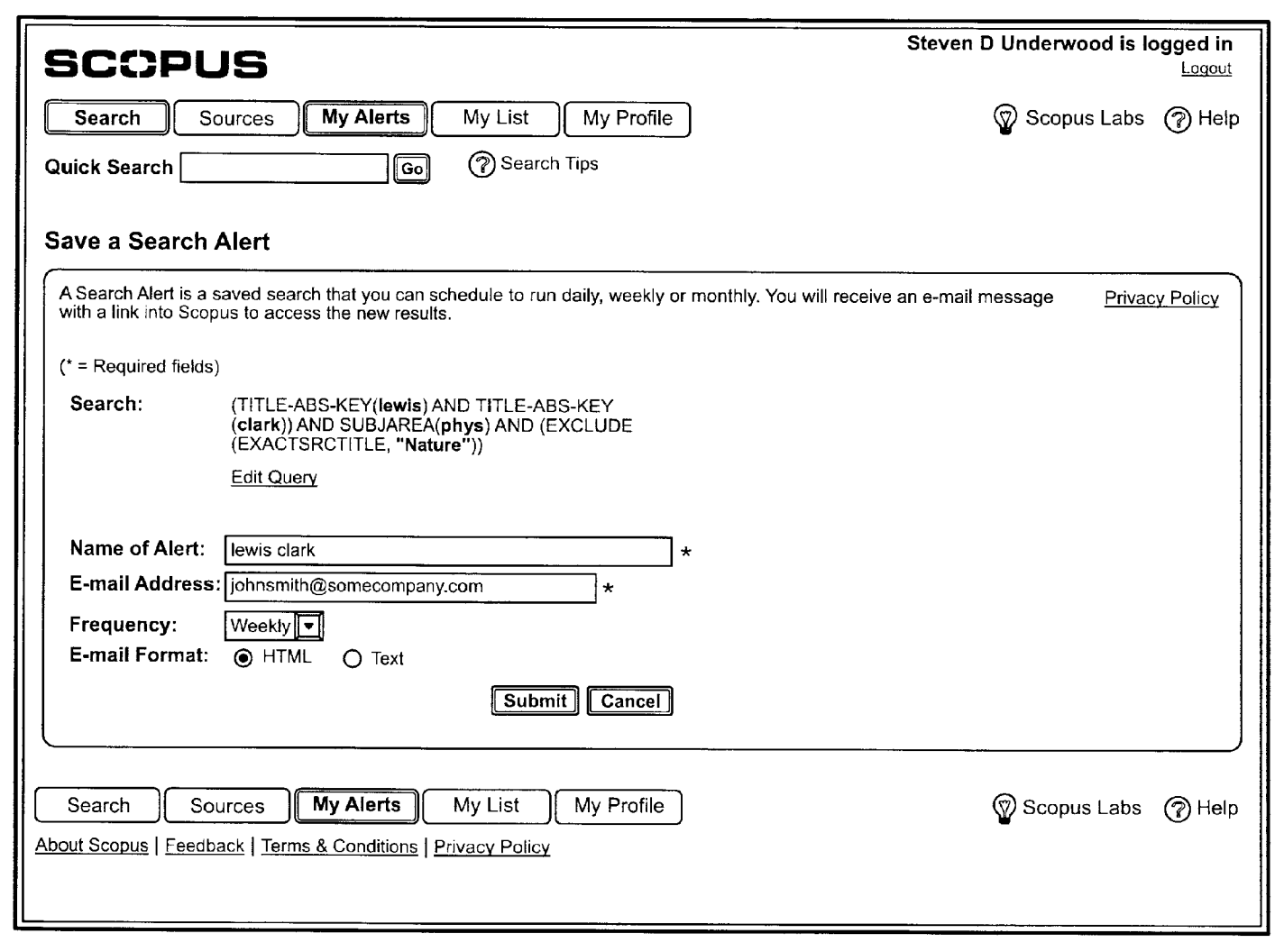

Save as search alert: If a user clicks Save as Alert link 434, a Search Alert setup page will display. See FIG. 7. If a user's search results in no listings, she may select the Save as search alert link to arrange for the search to reoccur at a later time. This will ensure that if new material arises in the future regarding her search query, Scopus will notify her of the result.

The results page (see FIG. 4) preferably has a "Scopus" tab 460, a "Web" tab 462, a "Patents" tab 464, and a "Combined Results" tab 466. Selecting either of these tabs will cluster the displayed results according to entered search criteria.

The Scopus tab 460 displays all results found within Scopus. A user may refine his Scopus results list by using Source Title, Author Name, Year, Document Type, and/or Subject Area check boxes to narrow the range of the search.

The Web tab 462 displays all results found on the World Wide Web (see FIG. 9). A user may refine her Web results by using available check boxes to narrow the search range. The preferred default sort order for Web results is Sort by Relevance. Results also may be sorted by date (descending or ascending) by clicking on Date column header 910.

The Patents tab 464 displays all patent results available for a basic, advanced, author, or quick search (see FIG. 10). A user may refine her Patents results by using available check boxes to narrow their range. Also, the default sort order for Patents is Document (Sort by Relevance). Similar to the Web tab, results can be sorted by date (descending or ascending) by clicking on the Date column header.

Figure 12:
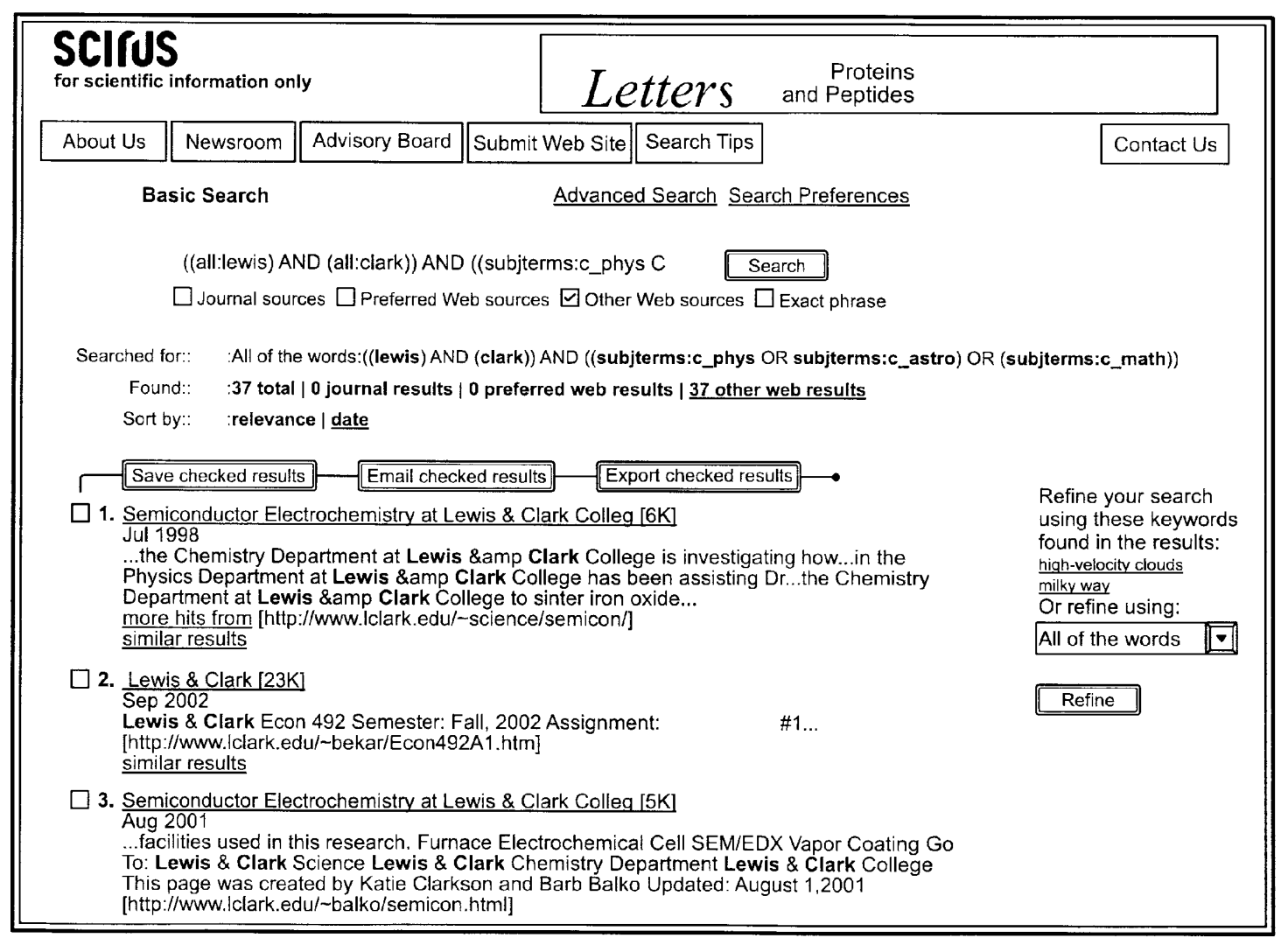

The Combined Results tab 466 displays all results found on the World Wide Web, available Patents, and Scopus (see FIG. 11). A user may refine his Combined Results by using Source Title, Author Name, Subject Area, and Web Keywords check boxes to narrow their range. Also, if a user clicks a "More results from this site" link 1110 from within the Web or Combined Results display, a new browser window will open to display a list of more results based upon a search conducted from Scirus (see FIG. 12). Scirus is a comprehensive science-specific Internet search engine that searches over 200 million science-specific Web pages. More information can be found at www.scirus.com.

A user can have the listed documents sorted according to various criteria by clicking on a "Document (sort by relevance)" link 425. Such criteria may include: relevance, date, author, number of times cited by other articles, and source title.

3. Link to Specific Documents:

Full-text articles, where available, are only one click away, and links are displayed directly from the results list, the abstract page, and the references.

A variety of linking options are available:

A "View at Publisher" button 440 links to full-text articles on publishers' sites: (a) via CrossRef, and (b) via Scopus's own knowledgebase of links to an additional 800 journals not covered by CrossRef. CrossRef is an official registration agency for scholarly and professional publications. It operates a cross-publisher citation linking system that allows a researcher to click on a reference citation on one publisher's platform and link directly to the cited content on another publisher's platform, subject to the target publisher's access control practices. See www.crossref.org.

"Full-Text" links (not shown in FIG. 4) allow a user to check her library's holdings and link to her entitled full-text articles via a link resolver. This image-enabled linking makes use of the library's full text entitlements to ensure that a full text link is shown only when she has rights to the full text, saving time and reducing frustration. The first link resolver to have implemented this image-based linking technology was LinkFinderPlus. SFX, a product similar to LinkFinderPlus, has now also enabled it. LinkFinderPlus, a product from Endeavor Information Systems, provides comprehensive linking for all of a library's resources, regardless of the software or information vendor. See www.endinfosys.com/prods/linkfinderplus. For SFX, see www.exlibrisgroup.com/sfx.

If the full text article is not available, librarians can choose to use a standard OpenURL link to display alternative services, such as document delivery or a link to their OPAC/library catalog. Document delivery and inter-library loan can be set up so that a customized link directs users to a web form chosen by the librarian.

Figure 13:
FIG. 13 depicts a preferred related documents page.

An "Abstract+Refs" button 450 links to a page displaying the abstract and references for the corresponding article. See FIGS. 8A and 8B. Note that the references displayed in FIG. 8B may also be viewable. A "Related Documents" link 810 will return a list of articles that share references with the selected document (see FIG. 13).

A "View on Web" link (not shown in FIG. 4) may link to the document on the Internet. The document will open in a new browser window.

4. Search History:

A session-based overview of up to 50 searches allows a user to review results, edit searches, save them for a future session, or set up an alert to receive new results by email. See FIG. 14.

5. Export Results:

From a document display page (see FIG. 8A), a user may click an "export" button 820 to have an "Export" page (see FIG. 15) displayed that allows the user to export his results in RefWorks, RIS, or ASCII format to reference management software such as Reference Manager, ProCite, or EndNote. RefWorks is a Web-based bibliography and database manager that allows users to create their own personal database by importing references from text files or online databases. They can use these references in writing their papers and automatically format the paper and the bibliography in seconds. See generally www.refworks.com; in particular, see www.refworks.com/scopus.shtml.

From the Export form, a user selects an Export Format (RefWorks direct export, Text (ASCII Format), or RIS format) using an Export Format dropdown menu 1510.

RefWorks direct export allows a user to choose RefWorks direct export to export directly online to RefWorks. Text (ASCII Format) allows a user to choose ASCII format to export a plain text document. RIS format allows a user to choose RIS format to export to other reference management applications including Reference Manager, ProCite, and EndNote.

EndNote, ProCite, and Reference Manager are well-known software tools for publishing and managing bibliographies. RIS is a format for converting references a user wishes to import into Reference Manager. The complete specification for the RIS format may be found at www.refman.com/support/risformat_intro.asp.

All reference types supported by Reference Manager are supported by the Capture routines for the RIS format.

A user may select a content format from a Content Format dropdown menu 1520. In a preferred embodiment, Content Format only applies to Scopus search results. Web results will always export in the same format regardless of which Content Format is selected. Two content formats are available: "Citations Only" and "Citation, Abstracts, Author Keywords and Cited By."

If Citations Only is selected, the following fields are exported (if available in Scopus): Author(s), Article Title, Publication Year, Source Title, Volume, Issue, and Page Number(s). For RIS and RefWorks formats, Document Type also is exported. Selecting Citation, Abstracts, Author Keywords and Cited By will export the same fields as the Citations Only export plus the abstracts, author keywords, and number of times cited.

A user then clicks Export button 1530 to begin the export process.

For RefWorks direct exports, if a user's RefWorks information has been set up in My Profile, Scopus will log in to RefWorks for the user, and the import will be run. The status of the user's RefWorks import will display in a new browser window.

If the user's RefWorks information has not been set up in My Profile, the RefWorks log in screen will appear in a new browser window, and the user will have to log in to proceed with the export.

For all other exports, a file download dialog box will appear allowing the user to save or open his exported file.

An export of the user's results also exports the citation count (cited by number) for those results.

Scopus preferably uses the following Web Services and applications:

ABSRET (Abstract Retrieval web service) is a SOAP-based web service that accesses the Scopus content repository containing the text of every Scopus document. The service provides for the retrieval of these documents in XML, based on a unique identifier assigned to every Scopus document.

ABSMET (Abstract Metadata web service) is a SOAP-based web service that accesses the Scopus metadata repository. This repository contains metadata about the Scopus documents and the publications from which they come.

FSTSCH (FAST Search web service) is a SOAP-based web service that provides a layer of abstraction to the FAST Search engine. This service provides an implementation of a common search layer that can be layered on top of search engines. Each search service translates from a common Elsevier search syntax to specific syntax used by a search engine.

JNLMET (Journal Metadata web service) is a SOAP-based web service that accesses the Science Direct journal metadata repository. This repository contains metadata about the full-text journals provided through Science Direct, another Elsevier web product.

CSAS (Customer System Application Service) is a SOAP-based web service that provides authorization services for Scopus. It provides access to a customer database maintained by the Scopus/Science Direct Customer System.

SSWS (Scheduled Search Web Service) is a SOAP-based web service that provides for the running of user searches on a scheduled basis. Scopus users can request that particular searches be run on their behalf on a daily, weekly, or monthly schedule. This service submits the searches to the FAST Search Service.

OHUB (outward linking hub) is a web-accessible service that provides lookup capability to determine whether a link can be built to an Elsevier or other publisher's website containing full-text journals.

Home Page Process Flow

A user preferably links to http://www.scopus.com/. If the user is authenticated the home page is presented. The home page is the basic search form. If the user is not authenticated he sees a marketing page.

Basic Search Process Flow

Figure 2:
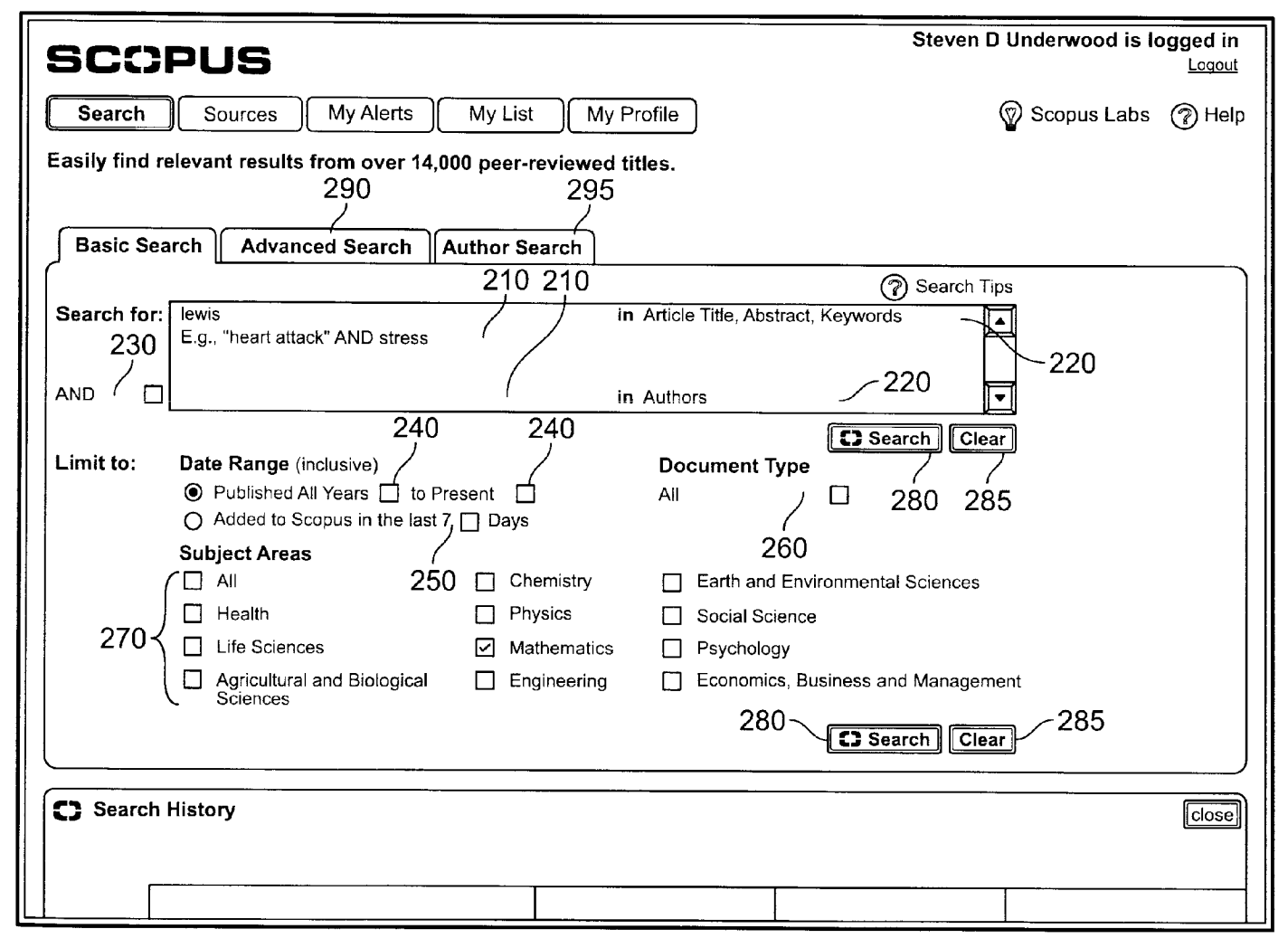

A user submits a search. A Basic Search form is depicted in FIG. 2. Search text is passed to the Fast Search web service which communicates with FAST to get search results. FAST (Fast Search & Transfer) is a well-known provider of enterprise search solutions, providing businesses and government organizations with the ability to dynamically, access, retrieve, and analyze information in real time, regardless of data format, structure, or location. See www.fastsearch.com.

The user is redirected to the search results screen. To list the search results, Scopus calls the Fast Search web service to get document information. Scopus calls the Journal Metadata service and/or the Elsevier OHUB (outward linking hub) application to find out what should built for a "View At Publisher" link. That is, Scopus optionally calls the Journal Metadata Service to determine if a link can be properly built from an article in the results list to Science Direct, Elsevier's full-text journal website. It also calls the OHUB to determine if a link can be properly built from an article in the results list to Elsevier or other publishers' full-text websites. Scopus also read the Scopus Oracle database to find out what to do about LSI linking for this user.

Abstract Retrieval Process Flow

A user may wish to view a document abstract from his search results. A request is made to the Abstract Retrieval Service to find the document and retrieve the text. Scopus also uses the Abstract Metadata Service, Journal Metadata Service, OHUB, and the Fast Search Service to enhance the page with multiple kinds of linking information to other Scopus documents, full-text documents, and "Cited By" information.

View At Publisher Process Flow

A user may click on a "View At Publisher" link when viewing search results. The View At Publisher link will have been built when the search results page or abstract document page was rendered. The result may be a redirect to a Science Direct Gateway URL (www.sciencedirect.com/science?_ob=GatewayURL) or a redirect to the CrossRef lookup system (dx.doi.org/.), which will attempt to direct the user to a site where the full text of the document can be located. The results of clicking the View At Publisher link will be displayed in a new window.

Author Search Process Flow

A user clicking on a highlighted author name causes Scopus to run a search on that author. Scopus uses the Fast Search service to get the results set, and then, similar to Basic Search above, Scopus redirects the user to the results page. Scopus calls Fast Search, OHUB, and Journal Metadata services to build the results page.

"Cited By" Process Flow

A user may click on the "Cited By" link when viewing a results list or viewing an abstract. Scopus runs a search at FAST to get a results set. Then, similar to the Basic Search above, Scopus redirects the user to a results page. Scopus uses the Fast Search service, Journal Metadata Service, and OHUB to build the results page.

Quick Search Process Flow

A user may type search term(s) into the quick search box and hit submit. Scopus calls the fast search service to run a search and produce a results set. Then, similar to what's noted above for basic search, Scopus redirects the user to the results set page. Scopus uses OHUB, Fast Search, and Journal Metadata Service to build this page.

Search in Search Results Process Flow

When a user enters search terms in a "Search in Search Results" text entry box, Scopus makes a new search string by combining the previous search string and the new search terms, and calls the Fast Search Service to get a new results set. Then, like Basic Search above, the user is redirected to a results screen, and Scopus uses the Fast Search Service, OHUB, and Journal Metadata Service to build this screen.

Those skilled in the art will recognize that the invention is not limited to specific terminology. For example, whether the above-described page is call a "Search in search results" page or a "Search within results" page (or something else) is irrelevant. As long as the page has the described or equivalent functionality, it is encompassed by the present invention.

Refine Results Process Flow

A user may choose to limit search results to particular sources, authors, years, types of documents, or subjects. The user also may choose to exclude particular sources, authors, years, types of documents, or subjects. The user can click on "more" links to expand his choices and can open and close the Refine Results box. Like all results lists requests, these activities cause Scopus to contact the Fast Search service as well as the journal metadata service and the OHUB.

Export Process Flow

Figure 14:
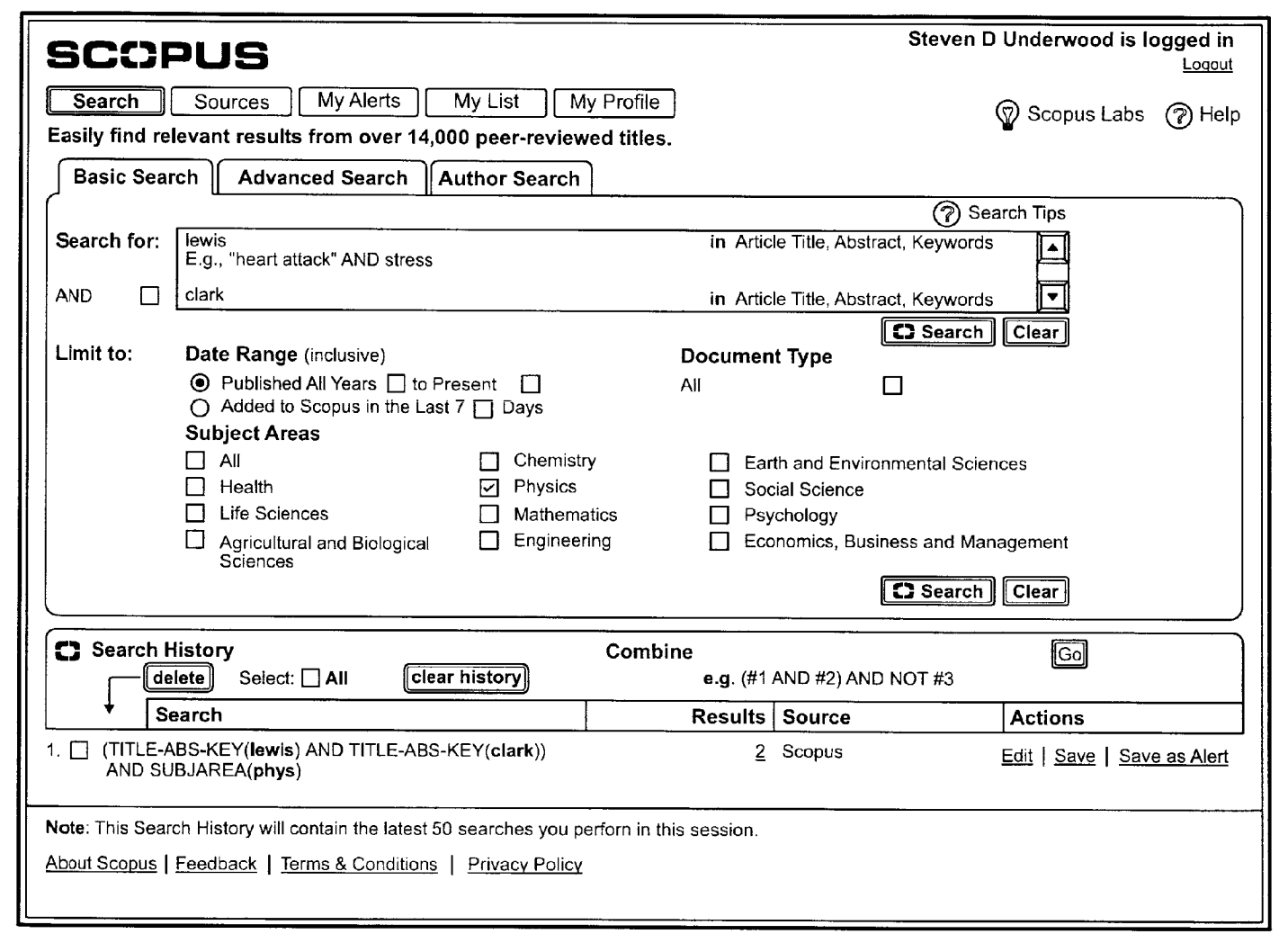

Selecting documents and clicking on "export" sends the user to a confirmation page (see FIG. 14). On this screen the user can choose to download Citation Only or Citation, Abstract, and Keywords, and then choose the format in which to download.

Login Process Flow

Scopus user enters this URL: http://www.scopus.com/scopus/standard/login.url. The user is presented with a login box. If the user is authenticated he will see the home page. If not, he will receive a message that an invalid user name/password were entered.

Sort Process Flow.

A user may choose to sort his results set by relevance, date, author, number of times the articles were cited by other articles, or by source title.

The flow and services used and requests received is the same for navigation between chunks or your results set (i.e., next page, previous page)

Similar References Process Flow

When viewing an abstract or document a user may click on a Similar References link. This causes Scopus to send a search to the fast search service and then, similar to the other searches, the user is redirected to the results screen.

Alerts

Scopus also allows users with a user ID to save citation and search alerts. Alerts can be accessed via an Alerts tab. A citation alert watches for new articles that refer to (or cite) the article for which the user sets up the alert. A search alert watches for new articles that contain the search terms from the user's original search.

Alert processing uses the FSTSCH (fast search) service and the SSWS (Search Scheduling web service). The Search Scheduling Web Service maintains a repository of searches submitted by Scopus users to be run on a scheduled basis. It manages the scheduled submitting of these searches to the Fast Search Web Service. It alters each search before submitting it to ensure that only Scopus documents loaded since the last time the search was run will be considered as potential search results.

Scirus Search Results

Submitted searches may return Scopus results and Scirus results. Both are delivered by the fast search engine. The default is to display the Scopus results but the results page also has a tab for displaying "Web" and "Combined" results.

Search History

Search history is a list of all the searches a user has submitted during her Scopus session. It only lives for the life of her session. The user will see this history at the bottom of the search form. The search history can be closed if its display is not desired, and this clears the history. It can be turned back on again by clicking "open" in the search history box on the search form. From the search history display the user can re-access the search results, edit the search, or save the search as a saved search or as an alert. Search history itself is handled within Scopus. Actions to rerun, edit, or save searches will call whatever services are regularly needed for those functions.

Saved Search

A search can be saved permanently by clicking SAVE on a search results page or on the user's search history page. Saved Searches are accessed under the My Profile tab. From the saved search display the user can view all search results, view new search results, edit the search, or save the search as an alert.

Advanced Search Form

A tab on the basic search form allows a user to bring up an advanced search form. This form allows the user to enter any Boolean or free form search and to search any segments desired. A list of some but not all segments is provided on this form. A nice feature is that if the user fills in the basic search form and then clicks the advanced search tab, his search is carried over to the advanced search form.

Author Search

The author search feature provides users WITH the option to execute a search on an author name from a new form in the search room. This will mainly serve two purposes. First, to find articles by an author and second, to give users background information about the author, like contact details, last known affiliation and subject fields an author is working in. This search will produce a new, intermediate results list of authors on the author search page that allows the user to select documents by the authors found in the search. Once selected, the documents can be displayed by clicking on the Show Documents button. The user will be taken to a standard Scopus results page.

Database

The Scopus web application accesses a database that stores product configuration data. Scopus accesses much information indirectly via web services, which then access various databases.

Software Component List and Descriptions

The table below identifies external software components that preferably are used for Scopus.

| | |
|---|---|
| SMAPI2.2 | System Management Application Programming Interface. Helps manage and instrument Java applications. |
| Log4J1.3 | A logging framework for Java applications |
| WAS5.1.1 | WebSphere Application Server |
| JRE1.4.1 | Java Runtime Environment |
| XERCES 4.0.13 | This is an XML parser |
| XALAN 2.6 | This is an XSLT processor for transforming xml documents into HTML. This is not the standard version provided by WebSphere. Scopus is using a new version, that includes a custom fix from Apache, for this release (R2.0). |
| STRUTS 1.1 | An open source framework for building Java applications |
| J2EE 1.3 | Java 2 Platform, Enterprise Edition. This version dictates the versions of various components that make up J2EE. For example: Servlet Specification level 2.3, JSP Specification level 1.2, and others. |
| SOAP | Simple Object Access Protocol - a communication protocol |

User Interface Benefits

There has been a substantial investment in developing Scopus along a User Centered Design approach. To date over 400 structured observation-and-interview sessions have taken place with scientists working at a many institutes around the world.

The user studies provided an in-depth understanding of the scientist's workflow, the information problems they encounter and the way they use information sources in their work. Analyses confirmed a number of use cases that helped guide the design of the Scopus UI.

Combining results of these studies with general knowledge of user interface design and human functions (like visual perception, memory, language, learning, attention and motor skills) enabled development of the concepts that together make Scopus a substantial improvement over prior art systems and software in terms of efficiency and effectiveness.

Usefulness and usability are crucial aspects for a system that needs to support search and navigation of otherwise overwhelming amounts of available scientific information that a scientist needs to perform his research well. Many scientific search and navigation systems are too complex to use. Scientists should be able to focus on the content of their (navigation) task—the tool should become invisible to them just as a pen is invisible to a writer.

Following is a description of certain advantages of the Scopus UI.

I. Search page: A well balanced and task oriented (as opposed to a "company oriented" or "technology-oriented") search form.

Well balanced:

The search form contains the right amount of elements to help the scientific user to both build up an effective query and provide information on the working and contents of the system without overloading the user with information or unnecessary complexity.

Task orientation:

The search form is the first page users encounter when typing in www.scopus.com. Other systems may bother the user with marketing information, extensive explanations of functionalities of the system or with multiple clicks before getting to a search form. Every click is a decision point for users; therefore, every extra click is burdening the limited available attentional resources that humans have available during cognitive work.

The layout and type of interface elements on this search form are carefully chosen and designed according to scientists' main use cases (tasks).

II. Results page

The goals here were to make ultra fast scanning and relevancy appraisal possible.

to optimize ease of navigating the results set; search transits smoothly into targeted as well as explorative browse possibilities.

The above mentioned goals are achieved through the following features:

The refine results box. This functionality clusters the results set on a set of dimensions deemed most important in searching for scientific information. It serves two purposes: evaluation and navigation.

1. Evaluation:
 a. A user can obtain an at-a-glance evaluation of the relevancy of the results set. With this functionality, the user does not need to go through the results set itself to evaluate the general relevancy of the returned results. In this capacity, the refine results box functions as a "cognitive preprocessor."
 b. In-depth evaluation of the scientific area pertaining to the particular search query: the clustering functionality allows the user to easily ascertain the major contributing authors, the main journals in that field, and publication trends over the years.

2. Navigation:
 a. Quick jumping to relevant subsets within the result set.
 b. Reducing the results set to more manageable numbers of hits.

The tabular display of information. This feature is uncommon for (scientific) search engines. However, it makes the following possible:

Ultra fast scanning of large results sets. The layout of traditional results sets forces the user to visually search for relevant (target) information that is mixed in with non-target information. Whether something is target or non-target information may vary on a second-to-second basis. For the general scientific searcher the title of the paper is in most cases the target information. In the tabular layout the user can let his eye slide vertically over the title-only information column. As soon as a title is encountered that is potentially of interest to the scientist, her search continues in a horizontal direction to evaluate the author's name, the journal title, and so on. This design allows the user to skip a large amount of non relevant information.

Quick perception and understanding of sort possibilities. Because the information is ordered in columns, the user immediately sees how the Scopus content is structured and can intuitively understand the sorting possibilities. One of the most powerful functions is the "Cited By" function. The user quickly understands that the results can be sorted by the number of times a paper is cited in other papers. On the one hand, this is a valuable indication of the influence a paper has in a particular field; on the other hand, it is a transparent and meaningful way to explore related information.

Quick linking to full text without disappointments

Another strong advantage of the results set is the indication of full text availability. When the user's affiliation has subscribed to full text access for a particular journal, this is indicated by a full text button associated with a particular search hit. This functionality prevents the user from having to navigate back and forth between the results set and referring pages, having to find out by clicking on each document link whether full text is available and being disappointed when no access is allowed, especially when the paper seems relevant.

Record Page

The record page (see, e.g., FIG. 8A) is designed for quick second-level evaluation of the relevancy of a record. Two particular functions make this page exceptionally valuable for the end user: the "Cited By" box, and the linked references.

The "Cited By" box on the right side of the page preferably displays a maximum of three referring papers that the user may follow, and a link to all referring papers. This functionality has also been subject to extensive experimentation. Only displaying the number of referring papers (i.e., not displaying the three most recent references) did not invite users to users to click it.

Users value the linked references listed underneath the abstract. This also allows users to explore the scientific field around a particular paper in a transparent and meaningful way.

In general, the effort invested in building Scopus and making it intuitive allows users to form a mental model of the system, which in turn allows users to use it in creative ways. The system minimizes visual search time and cognitive load on the part of the user. As a consequence, the user is able to handle larger amounts of information with more ease and in less time than prior art systems.

While particular elements, embodiments, and applications of the present invention have been shown and described, it should be understood that the invention is not limited thereto, since modifications may be made by those skilled in the art, particularly in light of the foregoing teaching. The appended claims are intended to cover all such modifications that come within the spirit and scope of the invention.

We claim:

1. A computer system for searching databases and displaying search results, comprising:
 one or more databases storing information regarding publications, said information comprising author, title, date of publication, abstract, cited references, and citing references data; and
 one or more Internet servers in communication with said one or more databases;
 wherein at least one of said one or more Internet servers is in communication with and configured to transmit data to a Web browser application resident on a user's computer, and wherein said data is sufficient to enable said browser to display:
 (a) a search page that allows said user to input publication search parameters; and
 (b) a results page comprising:
  a tabular display of results that allows said user to sort results according to date, relevance, author, source title, and number of citations to each publication, wherein said display of results further comprises an indication of availability of a link allowing said user access to the full text for each respective result and a link to at least one aspect of the publication corresponding to said result, and
  a listing of subsets of said results, located on screen and separate from said display of results, wherein said listing of subsets comprises a source title subset, a author name subset, a year subset, a document type subset, and a subject area subset, wherein the number of results in each said subset is listed adjacent to each respective subset to allow for at-a-glance evaluation of said results,
  wherein said subsets are user selectable, and wherein said user may limit said results on said results page to said selected subsets and said user may exclude from said results on said results page said selected subsets;
 (c) a record page for providing further details of a result, said record page including a reference citing to said result.

2. The computer system of claim 1, wherein, for at least one publication, said aspect comprises a full text display of said publication.

3. The computer system of claim 1, wherein, for at least one publication, said aspect comprises an abstract display of said publication.

4. The computer system of claim 1, wherein, for at least one publication, said aspect comprises a display of references cited in said publication.

5. The computer system of claim 1, wherein said data is sufficient to enable said browser to display, for at least one listed publication, a numeral representing how many other publications have cited to said publication.

6. The computer system of claim 1, wherein said tabular display of results that allows said user to sort results according to date, relevance, author, source title, and number of citations to each publication allows said user to limit publication titles displayed to publication titles for publications from one or more selected sources.

7. The computer system of claim 6, wherein said selected sources are selected from a list of sources limited to sources for publications in said list of publication titles.

8. The computer system of claim 1, wherein said tabular display of results that allows said user to sort results according to date, relevance, author, source title, and number of citations to each publication allows said user to limit publication titles displayed to publication titles for publications from one or more selected authors.

9. The computer system of claim 8, wherein said selected authors are selected from a list of authors limited to authors for publications in said list of publication titles.

10. The computer system of claim 1, wherein the results page further comprises one or more links to a display of the abstract and references for one or more publications.

11. The computer system of claim 1, wherein said data is sufficient to enable said browser to display an export page that allows said user to export the results in a plurality of formats.

* * * * *